US011978158B2

United States Patent
Collard et al.

(10) Patent No.: US 11,978,158 B2
(45) Date of Patent: May 7, 2024

(54) DETERMINING MINIMUM REGION FOR FINDING PLANAR SURFACES

(71) Applicant: Raytheon Company, Tewksbury, MA (US)

(72) Inventors: Corey J. Collard, Plano, TX (US); Jody D. Verret, Rockwall, TX (US); Joseph C. Landry, Dallas, TX (US)

(73) Assignee: Raytheon Company, Tewksbury, MA (US)

( * ) Notice: Subject to any disclaimer, the term of this patent is extended or adjusted under 35 U.S.C. 154(b) by 444 days.

(21) Appl. No.: 17/443,713

(22) Filed: Jul. 27, 2021

(65) Prior Publication Data

US 2023/0037328 A1    Feb. 9, 2023

(51) Int. Cl.
*G06T 17/05*   (2011.01)
*G06T 7/11*    (2017.01)
*G06T 7/60*    (2017.01)

(52) U.S. Cl.
CPC ............... *G06T 17/05* (2013.01); *G06T 7/11* (2017.01); *G06T 7/60* (2013.01); *G06T 2207/10028* (2013.01); *G06T 2207/30184* (2013.01)

(58) Field of Classification Search
CPC ... G06T 17/05; G06T 7/11; G06T 7/60; G06T 2207/10028; G06T 2207/30184; G06T 2207/10032; G06T 2207/20021; G06T 2207/30181
See application file for complete search history.

(56) References Cited

U.S. PATENT DOCUMENTS

| 2017/0154215 A1* | 6/2017 | Niinuma | G06V 10/267 |
| 2018/0315248 A1* | 11/2018 | Bastov | G06F 3/04815 |
| 2019/0005667 A1* | 1/2019 | Khawaja | G06T 7/536 |
| 2019/0120947 A1* | 4/2019 | Wheeler | H04N 13/106 |

FOREIGN PATENT DOCUMENTS

WO    2023009508    2/2023

OTHER PUBLICATIONS

El-Sayed, Emad, et al., "Plane detection in 3D point cloud using octree-balanced density down-sampling and iterative adaptive plane extraction", IET Image Processing, (Apr. 2018), 11 pgs.

(Continued)

*Primary Examiner* — Charles T Shedrick
(74) *Attorney, Agent, or Firm* — Schwegman Lundberg & Woessner, P.A.

(57) ABSTRACT

Systems, devices, methods, and computer-readable media for determining planarity in a 3D data set are provided. A method can include receiving or retrieving three-dimensional (3D) data of a geographical region, dividing the 3D data into first contiguous regions of specified first geographical dimensions, determining, for each first contiguous region of the first contiguous regions, respective measures of variation, identifying, based on the respective measures of variation, a search radius, dividing the 3D data into respective second contiguous or overlapping regions with dimensions the size of the identified search radius, and determining, based on the identified search radius, a planarity of each of the respective second contiguous or overlapping regions.

20 Claims, 11 Drawing Sheets

(56) References Cited

OTHER PUBLICATIONS

"International Application Serial No. PCT US2022 038322, International Search Report dated Nov. 8, 2022", 4 pgs.
"International Application Serial No. PCT US2022 038322, Written Opinion dated Nov. 8, 2022", 6 pgs.
Dey, Emon Kumar, "Effective Selection of Variable Point Neighbourhood for Feature Point Extraction from Aerial Building Point Cloud Data", Remote Sensing, vol. 13, No. 8, 1520, (Apr. 15, 2021), 1-25.
Otepka, J, "A framework for generic spatial search in 3d point clouds", ISPRS Annals of the Photogrammetry, Remote Sensing and Spatial Information Sciences, vol. V-2-2021, (Jun. 17, 2021), 35-42.
Weinmann, M, "Semantic 3D scene interpretation: A framework combining optimal neighborhood size selection with relevant features", ISPRS Annals of Photogrammetry, Remote Sensing and Spatial Information Sciences, vol. II-3, (Sep. 5, 2014), 181-188.

* cited by examiner

DETERMINING MINIMUM REGION FOR FINDING PLANAR SURFACES

GOVERNMENT RIGHTS

This invention was made with government support under government Contract HM0476-17-D-0015. The government has certain rights in the invention.

BACKGROUND

Generally planar surfaces in images can be used by analysts to determine a characteristic of an object in an image. An image is a set of coordinate points along with some color information (e.g., black, white, red, green, blue, grayscale, or the like). The coordinate points can provide three-dimensional location information (x, y, z). The object can be a land mass, building, vehicle, appliance, entity, or the like. The characteristic can be a surface normal, for example.

In determining a planarity of a surface, an analyst can select a patch of points within a specified geographical area. The analyst typically needs to determine how large an area the patch of points covers. If the selected area is too large, there is a better chance that an object outside of a planar surface and in the patch will be located within the selected area. Such an object will adversely affect the planarity calculation and can lead to an indication that an otherwise mostly planar surface is not planar. If the selected area is too small, noise in the set of points can dominate the planarity calculation, thus making the planarity calculation unreliable. It is desired to have a technique for determining a search area that balances the problems of search areas that are too large and search areas that are too small to provide search areas that are well-suited for planarity determinations.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Figure 1:
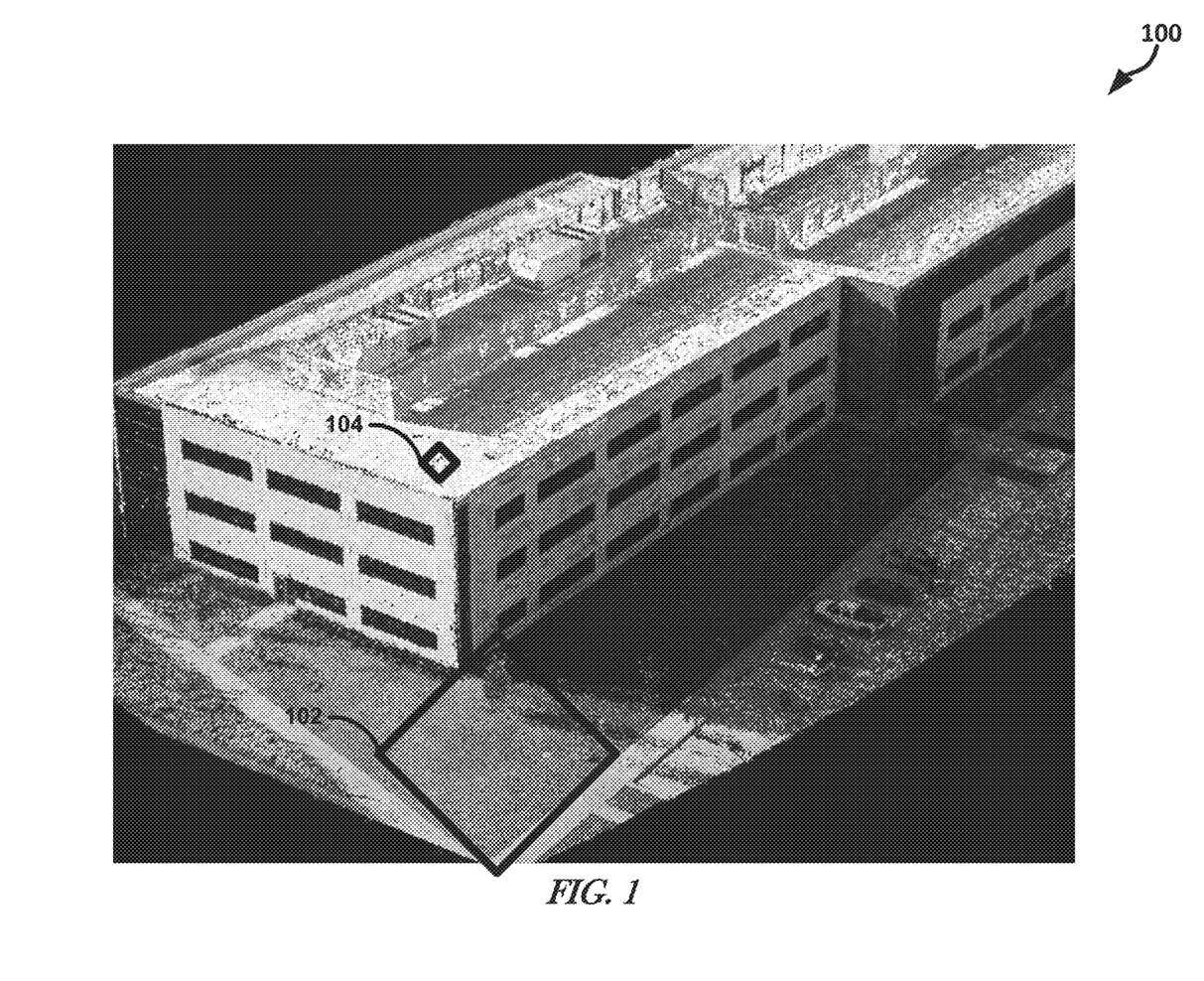
FIG. 1 illustrates, by way of example, an image rendering of a portion of a three-dimensional (3D) point set.

FIG. 1 illustrates, by way of example, an image 100 rendering of a portion of a three-dimensional (3D) point set. Each point in the image 100 includes four pieces of information, x location in space, y location in space, z location in space, and color for the given point. The color information is for visualization purposes and not needed for operation of embodiments.

The image 100 includes a first area 102 within a first search radius and a second area within a second area 104. Note that "radius", as used herein, typically refers to a length that is half of a side of a square. This definition allows an analyst to position squares that better cover the 3D point set than would be possible using circles, ellipses, or some other shapes. Directly adjacent radiuses can overlap, such as to help an analyst better determine where planar regions occur in the image.

The first area 102 is a larger area relative to the second area 104. The first area 102 includes objects (or portions of objects) that extends from a more planar surface. These objects, a tree and a portion of a building in the example of FIG. 1, will cause a planarity calculation to indicate that the first area 102 is less planar even though a vast majority of the first area 102 is generally planar. This indicates that the first area 102 may be too large for the illustrated portion of the 3D point set. With a search radius that is too large, smaller planar regions will not be detected as these smaller planar regions will be mixed with non-planar features in the area spanned by the search radius.

The second area 104 is small relative to the first area 102. The second area 104 spans fewer 3D points than the first area 102. A planarity calculation of the second area 104 will be affected more by noise in the data of the 3D point set than a planarity calculation of the first area 102. This is, at least in part, because the noise in the 3D points of the first area 102 are averaged out over more points. The planarity calculation of the second area 104 can be adversely affected by the noise in the 3D points.

An analyst can manually adjust the search radius until a balance is reached between noise and returning planar areas of sufficiently small size. However, this manual adjustment relies on analyst knowledge, a good guess as to the size of the planar area, or a combination thereof. What is desired is a technique for determining the search radius that does not rely on analyst expertise or a guess and check approach.

Figure 2:
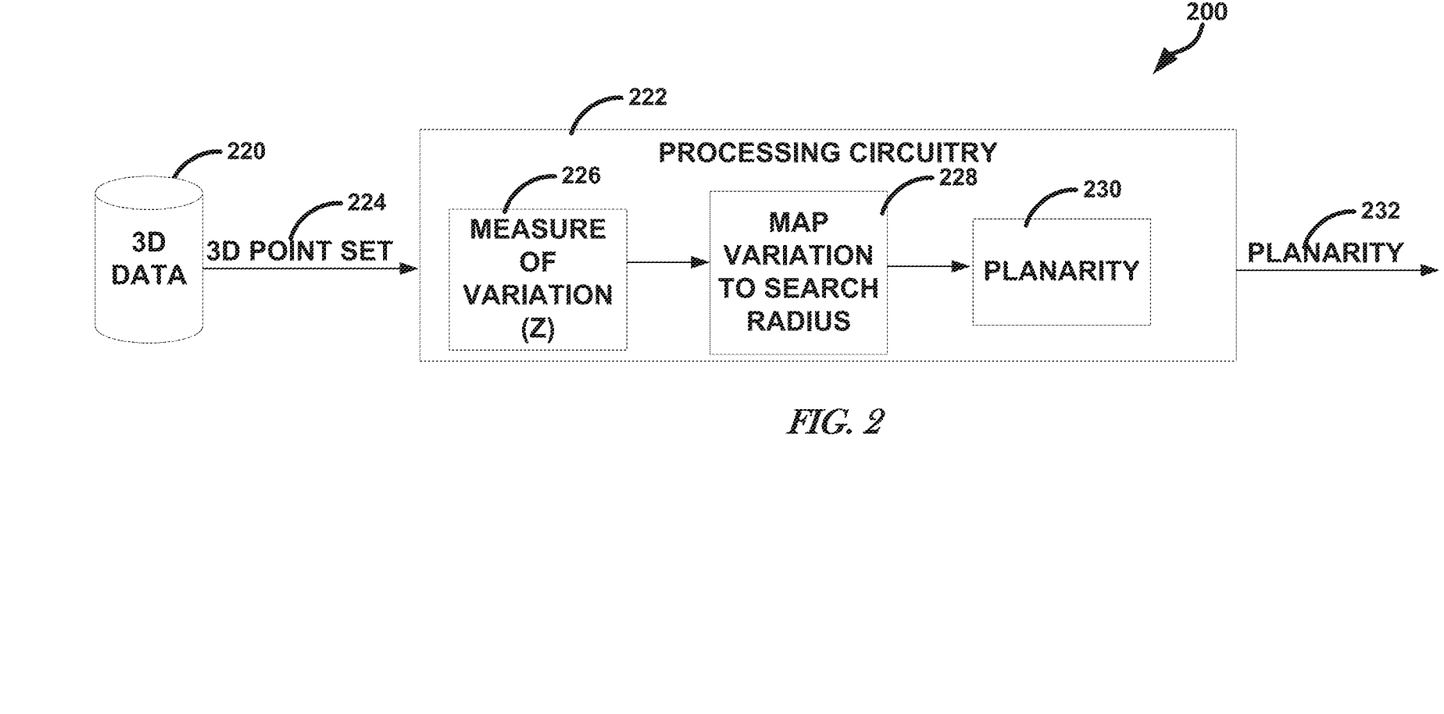
FIG. 2 illustrates, by way of example, a diagram of an embodiment of a system or determining a search radius suitable for determining planarity.

FIG. 2 illustrates, by way of example, a diagram of an embodiment of a system 200 for determining a search radius suitable for determining planarity. Suitable for determining planarity means that the search radius is not too large so as to not include smaller planar regions and is not too small so as to have noise in z-data dominate the planarity calculation. The system 200 as illustrated includes a repository 220 of 3D data points and processing circuitry 222. The repository 220 can include a database or other memory device that stores 3D data points. 3D points include an indication of location of the point in at least three spatial dimensions coordinates or sufficient information that can be used to locate the point in three spatial dimension. The coordinates can include latitude, longitude, altitude, polar coordinates, cartesian coordinates, or the like.

In some instances, the 3D data points of the repository 220 can be generated by a satellite, photogrammetry technique, a 3D scanner, or the like. The satellite can include light detection and ranging (LIDAR) or other 3D scanner that can determine a distance between the 3D scanner and a surface off which an emission from the 3D scanner reflects.

The processing circuitry 222 can retrieve or receive a 3D point set 224. The 3D point set 224 can include a proper subset of the 3D data in the repository 220. The processing circuitry 222 can determine planarity 232 of regions of the 3D point set 224. The regions can be sized to balance noise and size considerations as discussed previously.

The size of the regions can be determined by determining a measure of variation of z values in each region at operation 226. The size of the regions can be specified by a search radius. Search radius in this context means a square with sides whose respective lengths are twice the length of the radius. Other shapes are possible and considered part of this application, but the discussion that follows assumes a square region without loss of generality.

The size of the regions can be dependent on density of points in the 3D point set 224. A more dense point set can cover a smaller region, while a less dense point set can cover a larger region. This is because the more dense point set includes more points in a smaller geographical area than the less dense point set. Such an increased density of points provides more points per area and thus reduces an affect that noise has on a planarity calculation as compared to the less dense point set.

The measure of variation determination at operation 226 can be for each contiguous area of the defined size in the 3D point set 224. For example, FIG. 3 illustrates the image 100 of FIG. 1 split into contiguous regions of a predetermined size.

Figure 3:
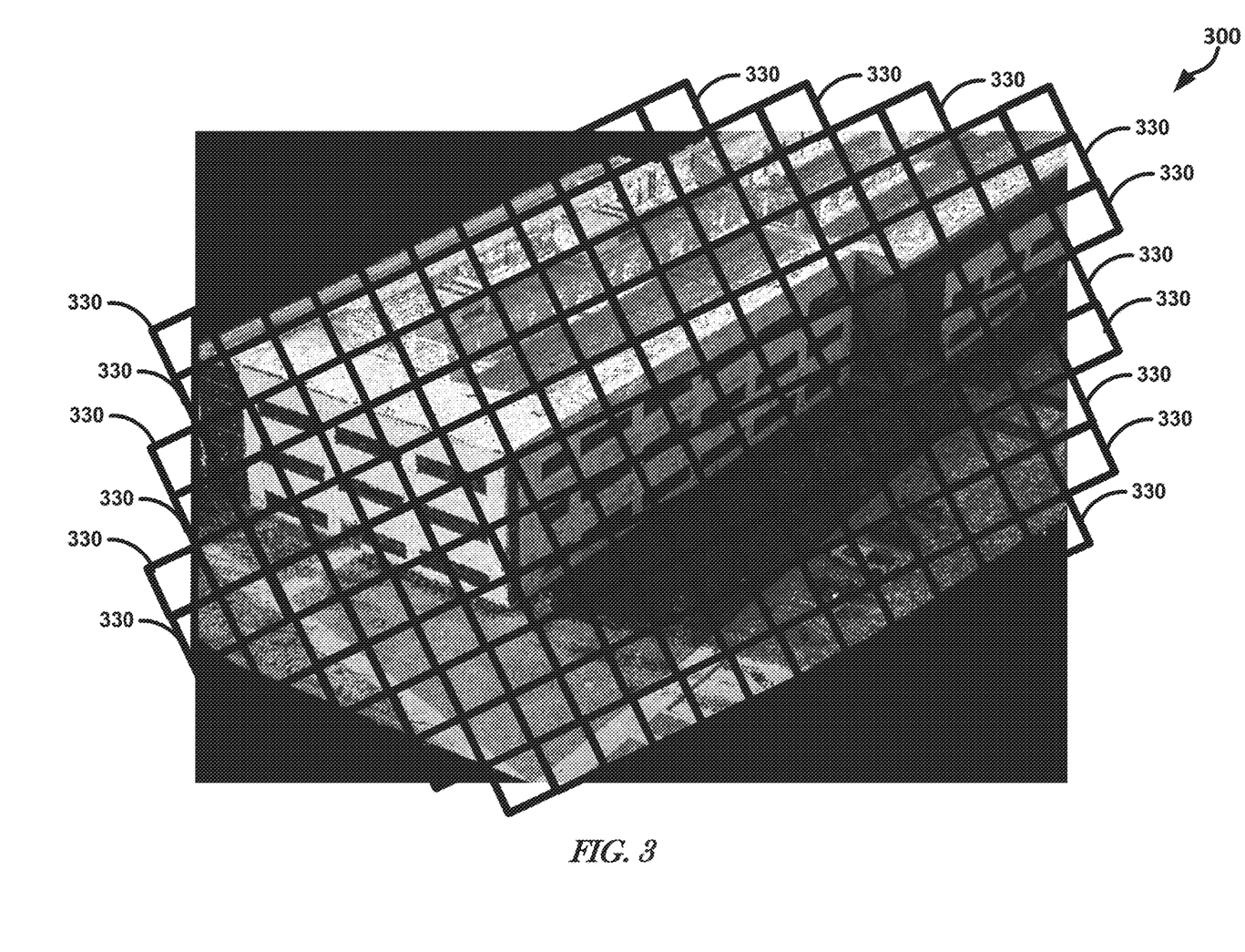
FIG. 3 illustrates, by way of example, an image split into contiguous regions of a predetermined size.

FIG. 3 illustrates, by way of example, an image 300 split into contiguous regions 330 of a predetermined size. The regions 330 can span a same number of points in the 3D point set 224, span a same geographical area, or the like. For each of the regions 330 that include a minimum number of points of the 3D point set 224 contained therein, a standard deviation, median absolute deviation, variance, or other measure of variation in the z-values of that region can be determined, at operation 226. The standard deviation is defined as: $\sigma = \sqrt{1/N \sum_{i=1}^{N}(z_i-\mu)^2}$, where $\mu = 1/N \sum_{i=1}^{N} z_i$, N is the number of data points in the given region 330, $z_i$ is a given altitude or elevation of a data point in the region 330.

The mean absolute deviation is defined as:

abs $\sigma = 1/N \sum_{i=1}^{N} |z_i - \mu|$.

The variance is defined as $\sigma^2$.

Referring back to FIG. 2, at operation 228, the measures of variation from operation 226 can be mapped to a search radius. A histogram of the measures of variation can be generated, at operation 228. A histogram includes bins that each hold a count of the number of regions 330 that include a measure of variation that maps to the bin. Each bin represents a range of values of the measures of variation. The range of the bins can be determined based on a total range of the measure of variation (the maximum measure of variation for the regions 330 minus the minimum amount of variation for the regions 330). The bin of the histogram that includes the highest count can be identified, at operation 228. The measure of variation associated with the bin of the histogram with the highest count can be mapped to a search radius.

Consider the histogram summarized in the following table:

TABLE 1

Example histogram of measures of variation of regions

| Measure of Variation Range | Count |
|---|---|
| [0, 0.2) | 82 |
| [0.2, 0.4) | 497 |
| [0.4, 0.6) | 248 |
| [0.6, 0.8) | 82 |
| [0.8, 1.0) | 18 |
| [1.0, 1.2) | 14 |
| [1.2, 1.4) | 5 |
| [1.4, 1.6) | 2 |
| [1.6, 1.8) | 6 |
| [1.8, 2.0) | 1 |
| [2.0, 2.2) | 3 |
| [2.2, 2.4) | 0 |
| [2.4, 2.6) | 1 |
| [2.6, 2.8) | 0 |
| [2.8, 3.0) | 3 |

The histogram bin with the highest count in the example of Table 1 is the bin to which measures of variation in the range [0.2, 0.4) are mapped. This measure of variation can then be mapped to a search radius using the following equation: Radius=C*measure of variation, where C can be determined empirically to achieve a desired planarity score, such as 0.6, 0.7, 0.8, 0.9, 0.95, a greater or less planarity score, or a planarity score therebetween. In this equation, standard deviation of z-values can be used as the measure of variation. In the example of the image in the FIGS., C was determined empirically to be about 4.6 to find a planarity score of 0.8 at portions of the image.

Figure 4:
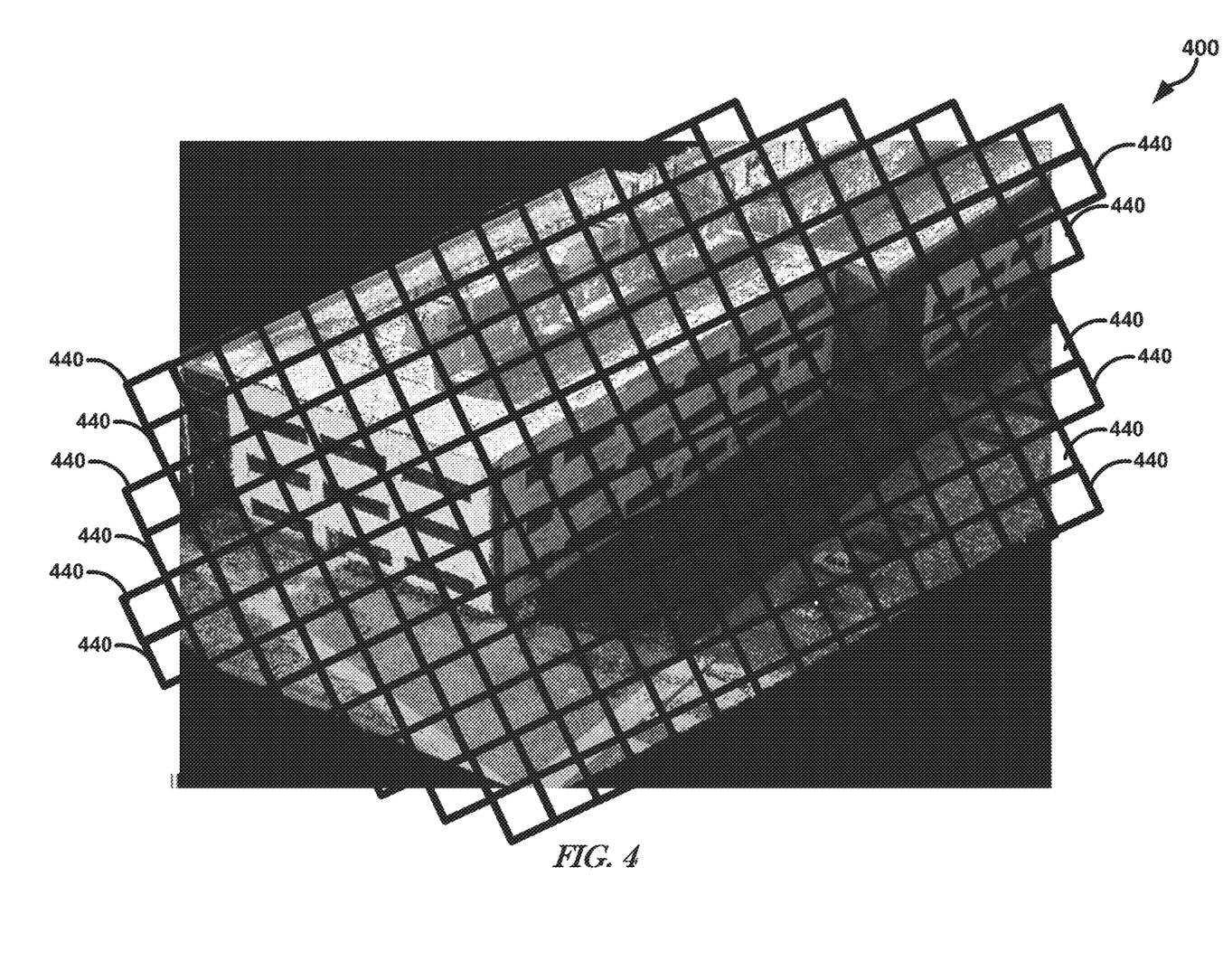
FIG. 4 illustrates, by way of example, the image split into contiguous regions of a size indicated by the determined search radius.

At operation 230, the 3D point set 224 can be segregated (again) into regions the size of the search radius determined at operation 228. FIG. 4 shows the image of FIGS. 1 and 3 split into contiguous regions according to the search radius determined at operation 228.

FIG. 4 illustrates, by way of example, an image 440 split into contiguous regions 440 of a size indicated by the determined search radius. In the example of FIG. 4, the search radius is smaller than the regions used to determine the measure of variation. Referring back to FIG. 2, the operation 230 can include for 3D data points in each of the regions 440, determining the planarity. The planarity is described in more detail next.

Planarity is a measure of how flat an object is, or in other words, how closely points lie within a plane (in Euclidean space). A plane is a two-dimensional analog of a point or line. The plane is uniquely defined by three non-colinear points, a line and a point not on the line, or two distinct intersecting or distinct parallel lines. A measure of planarity can be determined based on normalized Eigenvalues of a covariance matrix. The measure of planarity can provide a value that is in the range [0, 1] with values being closer to 1 being more planar and values closer to 0 being less planar. Consider the ordered Eigen-values $\lambda_1$, $\lambda_2$, $\lambda_3$ in which $\lambda_1 > \lambda_2 > \lambda_3$. Planarity can be determined as $(\lambda_2 - \lambda_3)/\lambda_1$. The Eigen values (lambdas) can be extracted from a sampled covariance matrix through Eigen decomposition (which gives both Eigen values and Eigen vectors). The combination of the eigen values in different mathematical ways gives Eigen features (planarity, linearity, sphericity, . . . ).

A planarity 232 of respective segregated regions 440 can indicate the flatness of the geographical region in the respective region 440. The planarity 232 has a variety of uses including identifying surface normals, which is useful for computer graphics, determining error or noise in the 3D point set 224, such as to determine orientation and shape of the per point error covariance, providing accurate visualization of light reflection or specular, or the like.

Figure 5A:
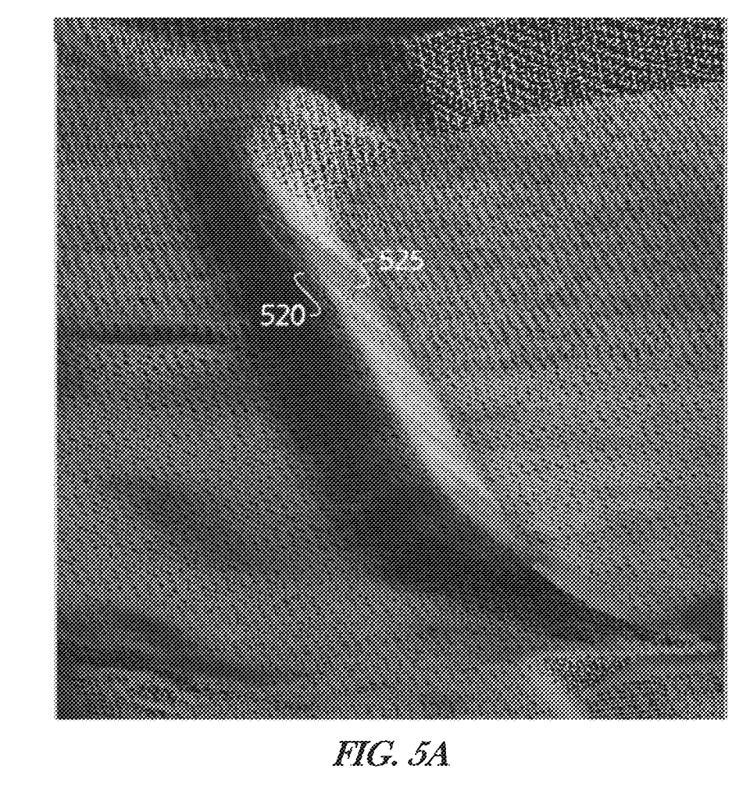
FIGS. 5A and 5B illustrate, by way of example, visualization of dynamically-computed sample covariance ellipsoids.
Figure 5B:
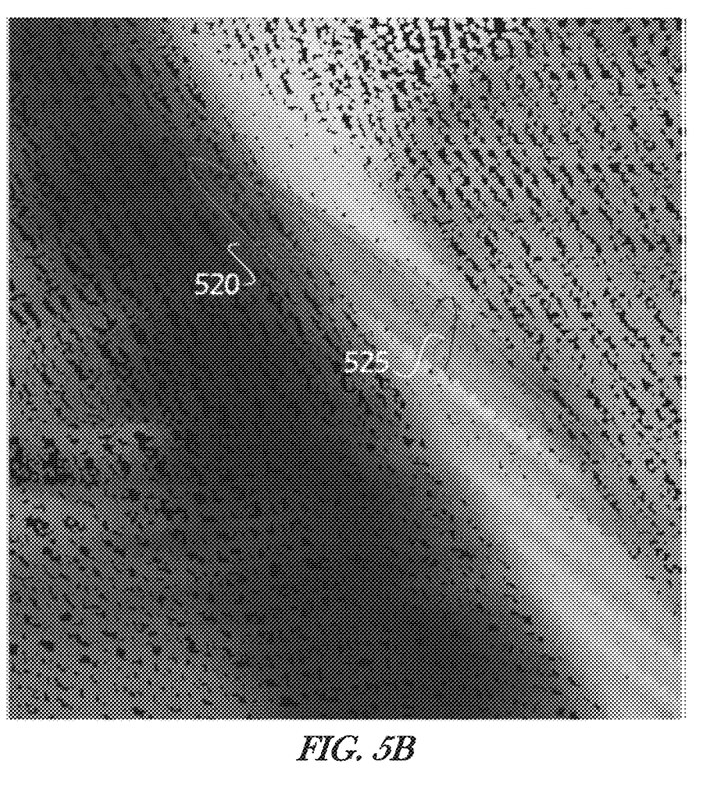

FIGS. 5A and 5B illustrate, by way of example, visualization of dynamically-computed sample covariance ellipsoids. The sample covariance in this example was computed by sampling 3D LADAR points.

Sample covariance differs from error covariance in that it is derived from an actual sampling of local x, y, z coordinates (as contrasted with accuracy of those coordinates). Three-dimensional sample covariance is computed via the following formulas.

$$sampleCovariance = \underset{3\times 3}{C} = \frac{1}{N-1}(\underset{3\times N}{B^T}\underset{N\times 3}{B}) \quad (11)$$

Where $$\underset{N\times 3}{B} = \begin{bmatrix} x_1 - \mu_x & y_1 - \mu_y & z_1 - \mu_z \\ x_2 - \mu_x & y_2 - \mu_y & z_2 - \mu_z \\ \vdots & \vdots & \vdots \\ x_N - \mu_x & y_N - \mu_y & z_N - \mu_z \end{bmatrix} \quad (12)$$

with $$\mu_x = \frac{1}{N}\sum_{i=1}^{N} x_i \quad (13)$$

$$\mu_y = \frac{1}{N}\sum_{i=1}^{N} y_i \quad (14)$$

$$\mu_z = \frac{1}{N}\sum_{i=1}^{N} z_i \quad (15)$$

In one embodiment, the point locations [xi yi zi] are formed from a sampling of points in a region around the user's cursor. The sample covariance, displayed in FIGS. 5A and 5B as the sample covariance ellipsoid 520, provides characterization of the "local shape" of a surface. In particular, the orientation and direction of the smallest eigenvector (the line 525) may represent the surface normal of the local data. Eigen values can be computed based on the sample covariance matrix and used in the planarity calculation presented previously.

Figure 6:
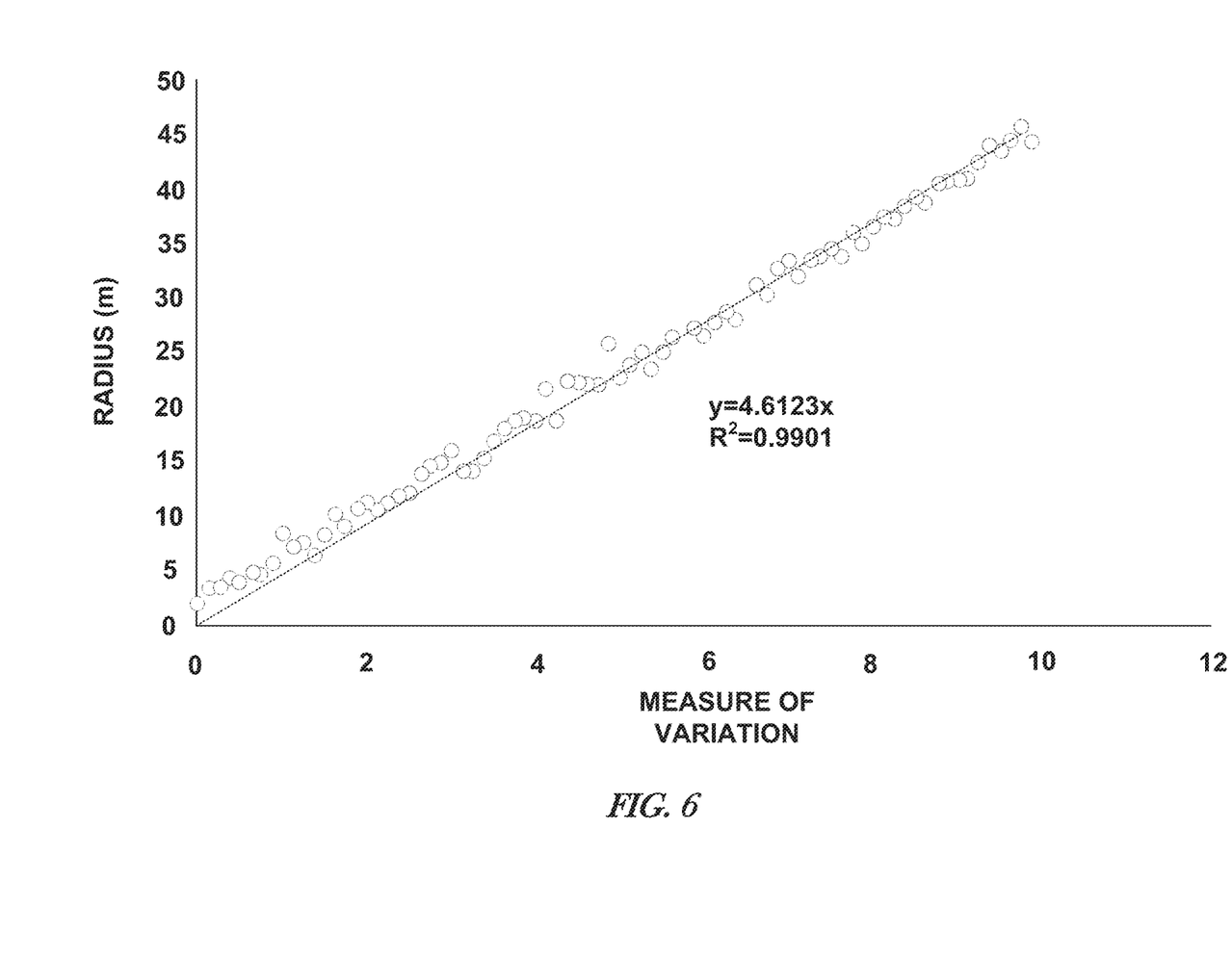
FIG. 6 illustrates, by way of example, a graph of radius (m) versus measure of variation for a variety of radii.

FIG. 6 illustrates, by way of example, a graph of radius (m) versus measure of variation for a variety of radii. The graph can be generated to identify the value of C in the equation Radius=C*measure of variation. In the example graph illustrated, a slope of a line fit to the data points is about 4.6. This can be multiplied by the measure of variation to determine the radius to be used. In this example, the radius is about 1 meter.

Figure 7:
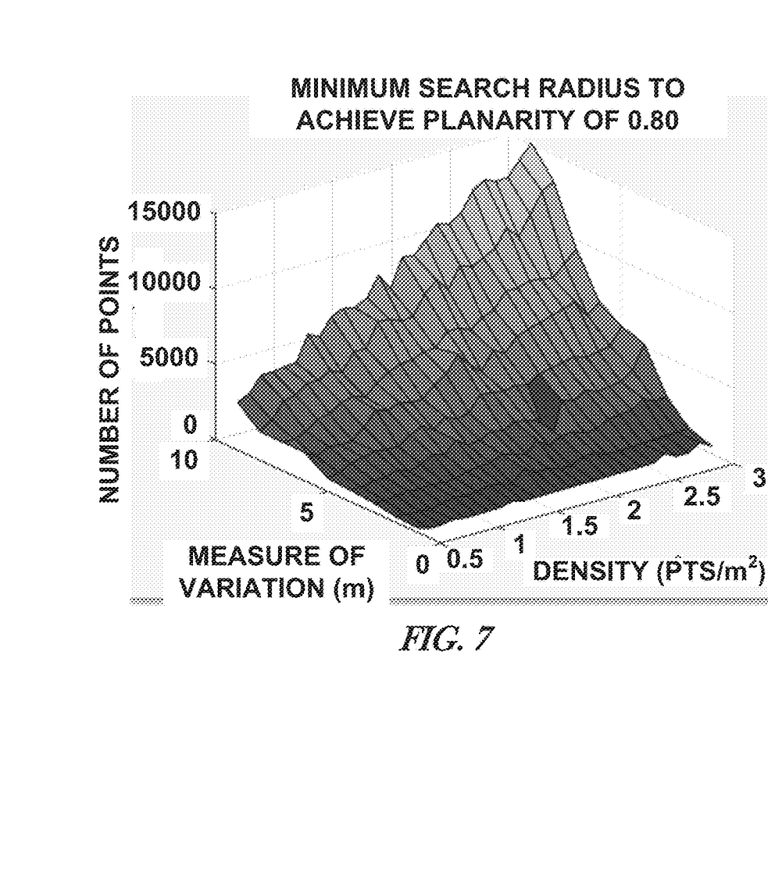
FIG. 7 illustrates, by way of example, a 3D graph of number of points versus measure of variation versus density.

FIG. 7 illustrates, by way of example, a 3D graph of number of points versus measure of variation versus density. As can be seen in the graph in FIG. 7, the number of points is dependent on both the point density and the measure of variation in the data set.

Figure 8:
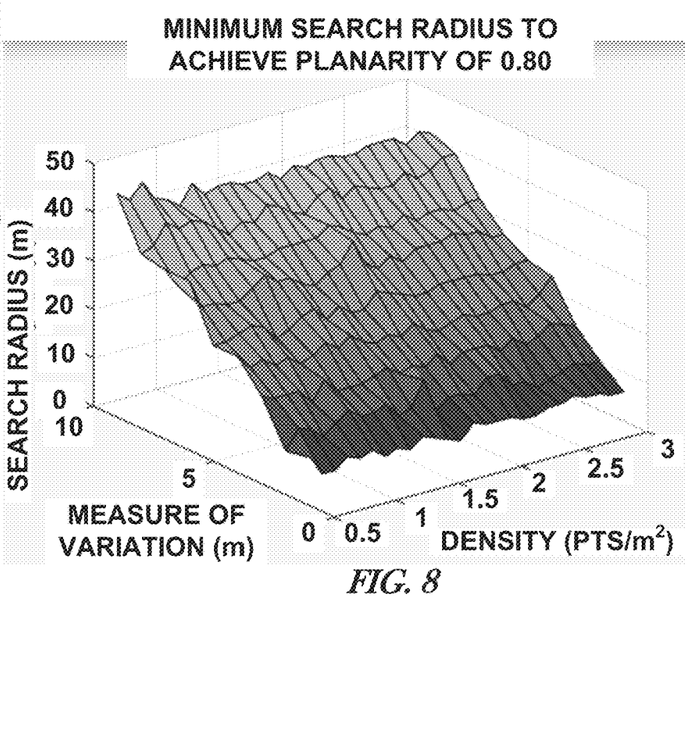
FIG. 8 illustrates, by way of example, a 3D graph of search radius versus measure of variation versus point density.

FIG. 8 illustrates, by way of example, a 3D graph of search radius versus measure of variation versus point density. As can be seen in the graph in FIG. 8, the search radius is dependent on the measure of variation but is independent of the point density. FIGS. 7 and 8 illustrate why search radius is simpler to use than number of points.

Figure 9:
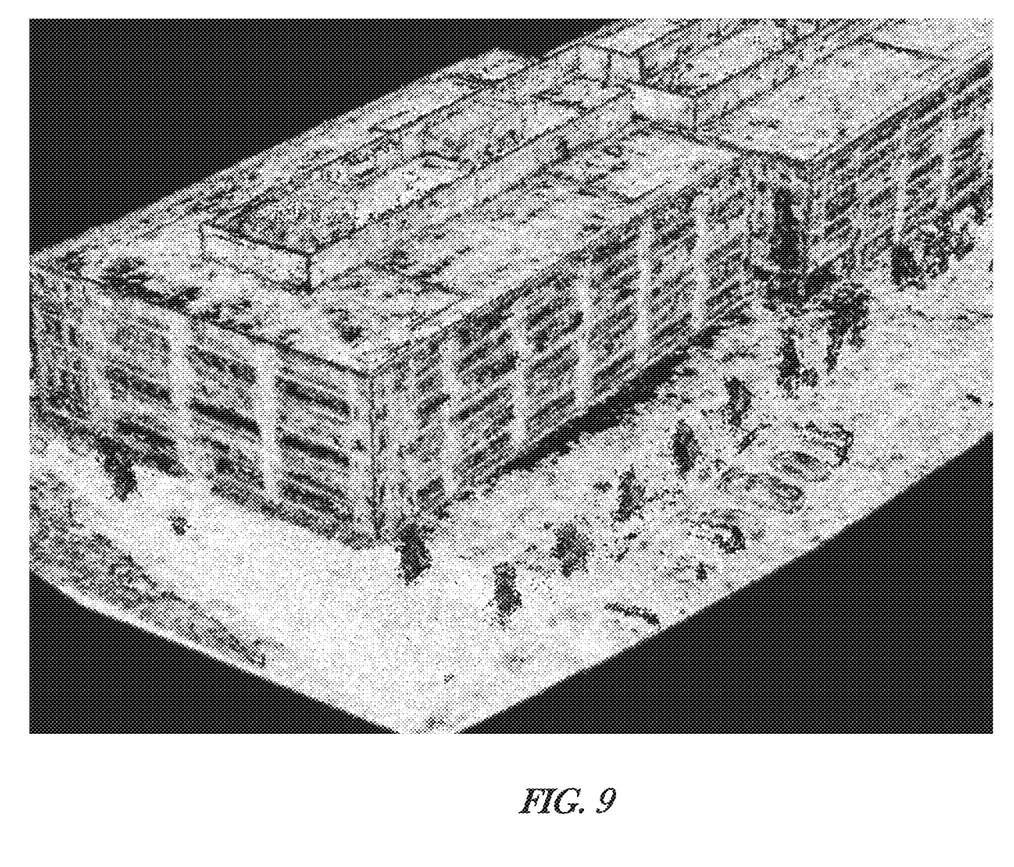
FIG. 9 illustrates, by way of example, an image of planarity of the image illustrated in FIG. 1.

FIG. 9 illustrates, by way of example, an image of planarity of the image illustrated in FIG. 1. The planarity of FIG. 9 is shaded in grayscale, such that more white is more planar and more black is less planar. A technique of embodiments was used to generate the image in FIG. 9.

Figure 10:
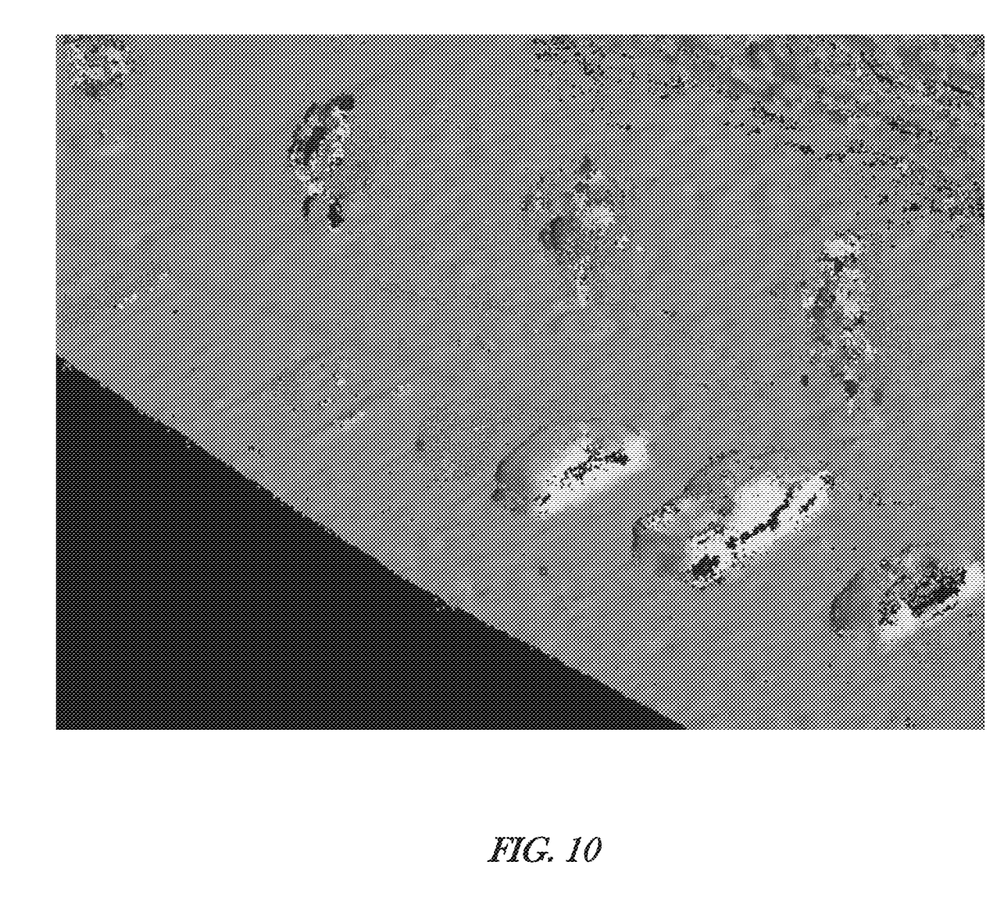
FIG. 10 illustrates, by way of example, an image of surface normals determined based on planarity determined according to an embodiment.

FIG. 10 illustrates, by way of example, an image of surface normals determined based on planarity determined according to an embodiment. The surface normals indicate a vector generally perpendicular to the surface. The surface in this instance is each of the contiguous regions 440. The planarity of the surfaces that comprise an object can be used to generate a model of the object. The surface normals can indicate a direction the contiguous region faces. The planarity or surface normal determination can be helpful to further determine how light will reflect off the object.

Figure 11:
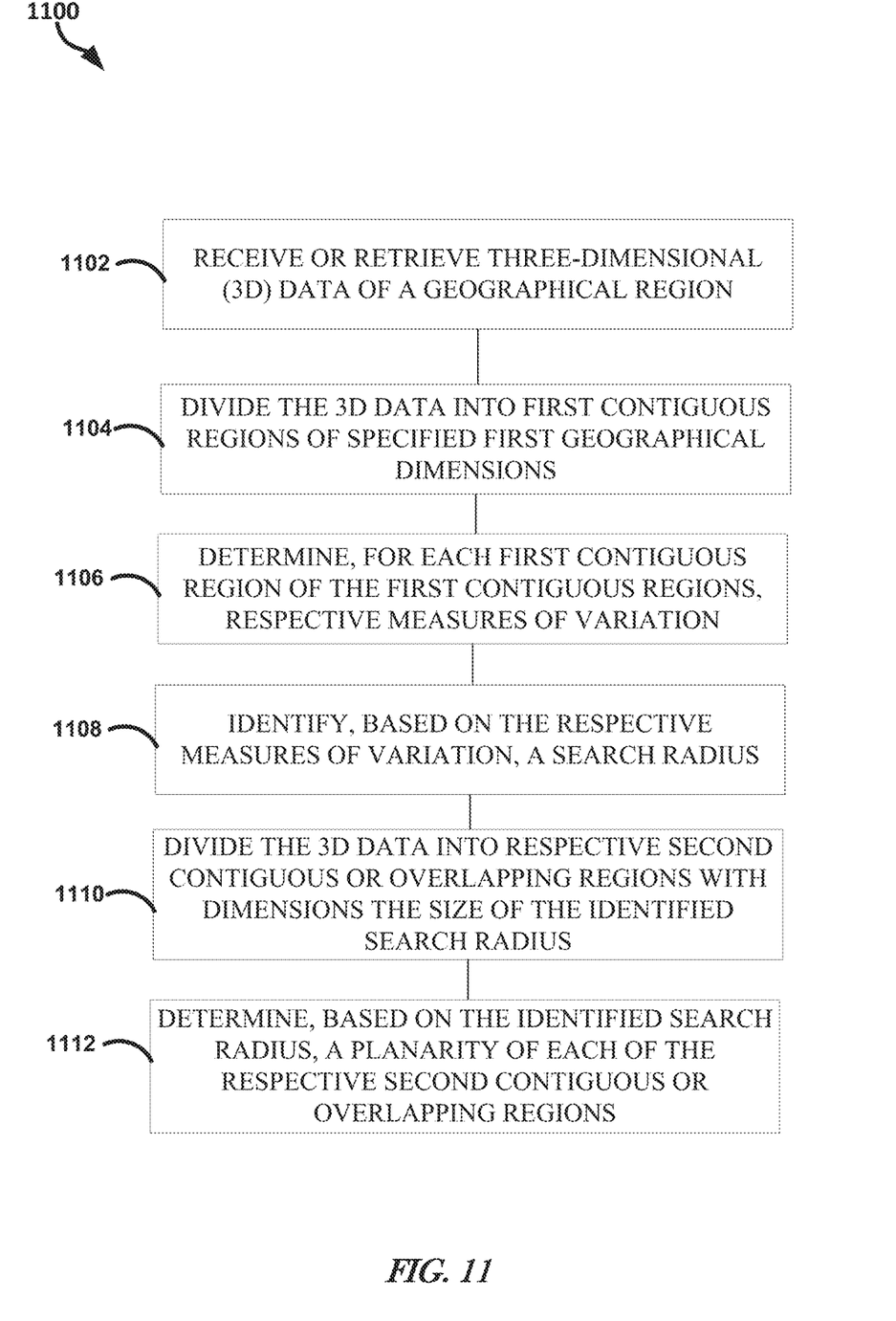
FIG. 11 illustrates, by way of example, a diagram of an embodiment of a method for determining planarity of a region of a point set or image.

FIG. 11 illustrates, by way of example, a diagram of an embodiment of a method 1100 for determining planarity of a region of a point set or image. The method 1100 as illustrated includes receiving or retrieving three-dimensional (3D) data of a geographical region, at operation 1102; dividing the 3D data into first contiguous regions of specified first geographical dimensions, at operation 1104; determining, for each first contiguous region of the first contiguous regions, respective measures of variation, at operation 1106; identifying, based on the respective measures of variation, a search radius, at operation 1108; dividing the 3D data into respective second contiguous or overlapping regions with dimensions the size of the identified search radius, at operation 1110; and determining, based on the identified search radius, a planarity of each of the respective second contiguous or overlapping regions, at operation 1112.

The method 1100 can further include, wherein identifying the search radius includes generating a histogram of the respective measures of variation, the histogram including bins, each bin associated with a range of the respective measures of variation and each bin including a count of a number of the respective measures of variation that are within the associated range. The method 1100 can further include, wherein identifying the search radius includes identifying a bin of the histogram with the largest count and mapping the range associated with the bin to the search radius. The method 1100 can further include, wherein the specified first geographical dimensions are based on a density of the 3D data.

The method 1100 can further include, wherein the measure of variation is a standard deviation, an absolute deviation, or a variance. The method 1100 can further include, wherein determining the planarity includes determining, for each of the respective second contiguous or overlapping regions, a respective covariance matrix of the 3D data corresponding to the respective second contiguous or overlapping region. The method 1100 can further include, wherein determining the planarity includes determining, for each of the respective second contiguous or overlapping regions, the planarity based on Eigen-features of the determined covariance matrix.

The method 1100 can further include generating an image of the 3D data set with pixels of the image colored in accord with the determined planarity. The method 1100 can further include determining surface normals of the second or overlapping contiguous regions based on the determined planarity. The method 1100 can further include generating an image model of an object in the 3D data set based on the determined planarity of second contiguous or overlapping regions corresponding to the object. The method 1100 can further include determining data point error of the 3D data in each of the second contiguous or overlapping regions based on the determined planarity.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 12:
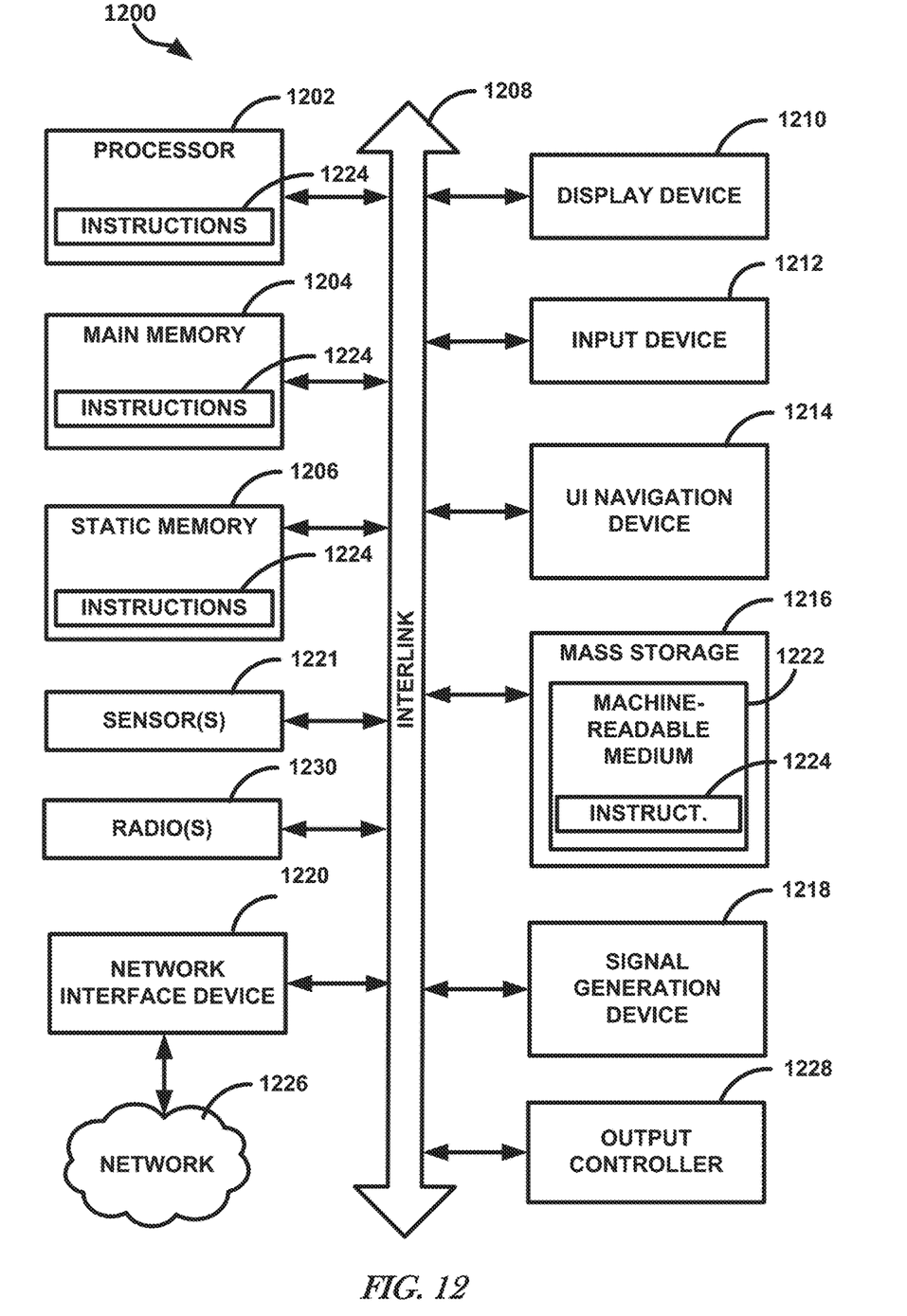
FIG. 12 illustrates, by way of example, a block diagram of an embodiment of a machine in the example form of a computer system 1200 within which instructions, for causing the machine to perform any one or more of the methodologies discussed herein, may be executed.

FIG. 12 illustrates, by way of example, a block diagram of an embodiment of a machine in the example form of a computer system 1200 within which instructions, for causing the machine to perform any one or more of the methodologies discussed herein, may be executed. One or more of can be implemented or performed by the computer system 1200. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 1221 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 1204 and a static memory 1206, which communicate with each other via a bus 1208. The memory 1204, 1206 can store parameters (sometimes called weights) that define operations of the processing circuitry 1202 or other component of the system 1200. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker), a network interface device 1220, and radios 1230 such as Bluetooth, WWAN, WLAN, and NFC, permitting the application of security controls on such protocols.

The machine 1200 as illustrated includes an output controller 1228. The output controller 1228 manages data flow to/from the machine 1200. The output controller 1228 is sometimes called a device controller, with software that directly interacts with the output controller 1128 being called a device driver.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204, the static memory 1206, and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks: magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Example

Example 1 can include a computer-implemented method comprising receiving or retrieving three-dimensional (3D) data of a geographical region, dividing the 3D data into first contiguous regions of specified first geographical dimensions, determining, for each first contiguous region of the first contiguous regions, respective measures of variation, identifying, based on the respective measures of variation, a search radius, dividing the 3D data into respective second contiguous or overlapping regions with dimensions the size of the identified search radius, and determining, based on the identified search radius, a planarity of each of the respective second contiguous or overlapping regions.

In Example 2, Example 1 can further include, wherein identifying the search radius includes generating a histogram of the respective measures of variation, the histogram including bins, each bin associated with a range of the respective measures of variation and each bin including a count of a number of the respective measures of variation that are within the associated range.

In Example 3, Example 2 can further include, wherein identifying the search radius includes identifying a bin of the histogram with the largest count and mapping the range associated with the bin to the search radius.

In Example 4, at least one of Examples 1-3 can further include, wherein the specified first geographical dimensions are based on a density of the 3D data.

In Example 5, at least one of Examples 1-4 can further include, wherein the measure of variation is a standard deviation, an absolute deviation, or a variance.

In Example 6, at least one of Examples 1-5 can further include, wherein determining the planarity includes determining, for each of the respective second contiguous or overlapping regions, a respective covariance matrix of the 3D data corresponding to the respective second contiguous or overlapping region, and determining, for each of the respective second contiguous or overlapping regions, the planarity based on Eigen-features of the determined covariance matrix.

In Example 7, at least one of Examples 1-6 can further include generating an image of the 3D data set with pixels of the image colored in accord with the determined planarity, determining surface normals of the second or overlapping contiguous regions based on the determined planarity, generating an image model of an object in the 3D data set based on the determined planarity of second contiguous or overlapping regions corresponding to the object, or determining data point error of the 3D data in each of the second contiguous or overlapping regions based on the determined planarity.

Example 8 can include a non-transitory machine-readable medium including instructions that, when executed by a machine, cause the machine to perform operations comprising the method of at least one of Examples 1-7.

Example 9 can include a system comprising processing circuitry and a memory device coupled to the processing circuitry, the memory device including instructions that, when executed by the processing circuitry, cause the processing circuitry to perform operations comprising the method of at least one of Examples 1-7.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A computer-implemented method comprising:
receiving or retrieving three-dimensional (3D) data of a geographical region;
dividing the 3D data into first contiguous regions of specified first geographical dimensions;
determining, for each first contiguous region of the first contiguous regions, respective measures of variation;
identifying, based on the respective measures of variation, a search radius;
dividing the 3D data into respective second contiguous or overlapping regions with dimensions the size of the identified search radius; and
determining, based on the identified search radius, a planarity of each of the respective second contiguous or overlapping regions.

2. The method of claim 1, wherein identifying the search radius includes generating a histogram of the respective measures of variation, the histogram including bins, each bin associated with a range of the respective measures of variation and each bin including a count of a number of the respective measures of variation that are within the associated range.

3. The method of claim 2, wherein identifying the search radius includes identifying a bin of the histogram with the largest count and mapping the range associated with the bin to the search radius.

4. The method of claim 1, wherein the specified first geographical dimensions are based on a density of the 3D data.

5. The method of claim 1, wherein the measure of variation is a standard deviation, an absolute deviation, or a variance.

6. The method of claim 1, wherein determining the planarity includes:
determining, for each of the respective second contiguous or overlapping regions, a respective covariance matrix of the 3D data corresponding to the respective second contiguous or overlapping region; and
determining, for each of the respective second contiguous or overlapping regions, the planarity based on Eigen-features of the determined covariance matrix.

7. The method of claim 1, further comprising:
generating an image of the 3D data set with pixels of the image colored in accord with the determined planarity;
determining surface normals of the second or overlapping contiguous regions based on the determined planarity;
generating an image model of an object in the 3D data set based on the determined planarity of second contiguous or overlapping regions corresponding to the object; or
determining data point error of the 3D data in each of the second contiguous or overlapping regions based on the determined planarity.

8. A non-transitory machine-readable medium including instructions that, when executed by a machine, cause the machine to perform operations comprising:
receiving or retrieving three-dimensional (3D) data of a geographical region;
dividing the 3D data into first contiguous regions of specified first geographical dimensions;
determining, for each first contiguous region of the first contiguous regions, respective measures of variation;
identifying, based on the respective measures of variation, a search radius;
dividing the 3D data into respective second contiguous or overlapping regions with dimensions the size of the identified search radius; and determining, based on the identified search radius, a planarity of each of the respective second contiguous or overlapping regions.

9. The non-transitory machine-readable medium of claim 8, wherein identifying the search radius includes generating a histogram of the respective measures of variation, the histogram including bins, each bin associated with a range of the respective measures of variation and each bin including a count of a number of the respective measures of variation that are within the associated range.

10. The non-transitory machine-readable medium of claim 9, wherein identifying the search radius includes identifying a bin of the histogram with the largest count and mapping the range associated with the bin to the search radius.

11. The non-transitory machine-readable medium of claim 8, wherein the specified first geographical dimensions are based on a density of the 3D data.

12. The non-transitory machine-readable medium of claim 8, wherein the measure of variation is a standard deviation, an absolute deviation, or a variance.

13. The non-transitory machine-readable medium of claim 8, wherein determining the planarity includes:
determining, for each of the respective second contiguous or overlapping regions, a respective covariance matrix of the 3D data corresponding to the respective second contiguous or overlapping region; and
determining, for each of the respective second contiguous or overlapping regions, the planarity based on Eigenfeatures of the determined covariance matrix.

14. The non-transitory machine-readable medium of claim 8, wherein the operations further comprise:
generating an image of the 3D data set with pixels of the image colored in accord with the determined planarity;
determining surface normals of the second or overlapping contiguous regions based on the determined planarity;
generating an image model of an object in the 3D data set based on the determined planarity of second contiguous or overlapping regions corresponding to the object; or
determining data point error of the 3D data in each of the second contiguous or overlapping regions based on the determined planarity.

15. A system comprising:
processing circuitry; and
a memory device coupled to the processing circuitry, the memory device including instructions that, when executed by the processing circuitry, cause the processing circuitry to perform operations comprising:
receiving or retrieving three-dimensional (3D) data of a geographical region;
dividing the 3D data into first contiguous regions of specified first geographical dimensions;
determining, for each first contiguous region of the first contiguous regions, respective measures of variation;
identifying, based on the respective measures of variation, a search radius;
dividing the 3D data into respective second contiguous or overlapping regions with dimensions the size of the identified search radius; and
determining, based on the identified search radius, a planarity of each of the respective second contiguous or overlapping regions.

16. The system of claim 15, wherein identifying the search radius includes generating a histogram of the respective measures of variation, the histogram including bins, each bin associated with a range of the respective measures of variation and each bin including a count of a number of the respective measures of variation that are within the associated range.

17. The system of claim 16, wherein identifying the search radius includes identifying a bin of the histogram with the largest count and mapping the range associated with the bin to the search radius.

18. The system of claim 15, wherein the specified first geographical dimensions are based on a density of the 3D data.

19. The system of claim 15, wherein the measure of variation is a standard deviation, an absolute deviation, or a variance.

20. The system of claim 15, wherein determining the planarity includes:
determining, for each of the respective second contiguous or overlapping regions, a respective covariance matrix of the 3D data corresponding to the respective second contiguous or overlapping region; and
determining, for each of the respective second contiguous or overlapping regions, the planarity based on Eigenfeatures of the determined covariance matrix.

* * * * *